March 4, 1952   C. C. COONS ET AL   2,587,968
ELECTRIC TOASTER
Filed Sept. 3, 1947   2 SHEETS—SHEET 1

INVENTORS.
Curtis C. Coons
& Otis B. Sutton
BY
Harry S. Demars
ATTORNEY.

INVENTORS.
Curtis C. Coons
& Otis B. Sutton
BY
Harry S. Demarsh
ATTORNEY.

Patented Mar. 4, 1952

2,587,968

UNITED STATES PATENT OFFICE 2,587,968

ELECTRIC TOASTER

Curtis C. Coons, North Canton, and Otis B. Sutton, Canton, Ohio, assignors to The Hoover Company, North Canton, Ohio, a corporation of Ohio Application September 3, 1947, Serial No. 771,912

14 Claims. (Cl. 99—329)

This invention relates to electric toasters and more particularly to a thermal timing mechanism for electric toasters.

It has been proposed to time successive toasting operations by the time it takes a thermal element to heat up. The thermal element must then be cooled before the next toasting operation can be begun. Such a timer has the disadvantage that some means must be provided for quickly cooling the thermal element after a toasting operation or the operator must wait until the thermal element has cooled naturally before another toasting operation can be begun.

It has also been proposed to time a toasting period by the time it takes a thermal element to cool off after it has been heated to a predetermined temperature. Such timers have the disadvantage that upon the initial operation the operator has to wait until the thermal element has been heated before a toasting operation can be begun. Additionally, after the first toasting operation the thermal element must again be brought to a predetermined high temperature before a second toasting operation can be begun.

According to the present invention the first toasting operation is timed by the time it takes a thermal element to heat up to a predetermined temperature, the second by the time it takes the thermal element to cool to a predetermined lower temperature, the third by the time it takes the thermal element to heat up again, etc., for succeeding toasting operations.

As can be seen, according to this invention, it is not necessary to wait after any toasting operation before a succeeding toasting operation can be begun.

It has also been proposed to time a toasting operation by the time it takes a thermal element to heat up to a predetermined temperature and then to cool again to a predetermined lower temperature. While such timers avoid any waiting by the operator the mechanism is of necessity quite complicated. In addition it is difficult to design a thermal timer of that type which will correctly time succeeding toasting operations as the temperature of the toaster rises with rapid successive use.

The heat-up and the heat-up, cool-off thermal timers are subject to the inherent difficulty that they tend to over compensate with rapid repeated use. That is, with successive toasting operations, as the toaster as a whole heats up more and more, the thermal timer also heats up more and more, but faster than the toaster as a whole, so that the timing interval for each succeeding toasting operation becomes less and less, with the result that after the first toasting operation the toast is underdone.

The cool-off thermal timers are subject to an inherent difficulty that as the toaster heats up with successive use it takes longer and longer for the thermal timer to cool off so that the timing interval increases with repeated use with the result that the toast is overdone.

According to the present invention, a thermal compensator is provided so that on a heating-up toasting operation, which succeeds a previous toasting operation the timing interval will be lengthened over that which would result if the compensator were not present and on the cooling-off toasting operation, the timing interval, following a previous toasting operation, will be shortened over that which would result if the thermal compensator were not present.

According to another feature of this invention a manuel adjustment is provided for adjusting for light, medium, or dark toast which is effective whether the timer is operating on a heat-up toasting operation or on a cool-off toasting operation.

According to another feature of this invention a latch mechanism is provided with a thermal timer for operating it which is effective to release the latch whether the timer is moving to its hot position or to its cold position.

Other objects and advantages of this invention will become apparent as the description proceeds when taken in connection with the accompanying drawings in which.

Figure 1:
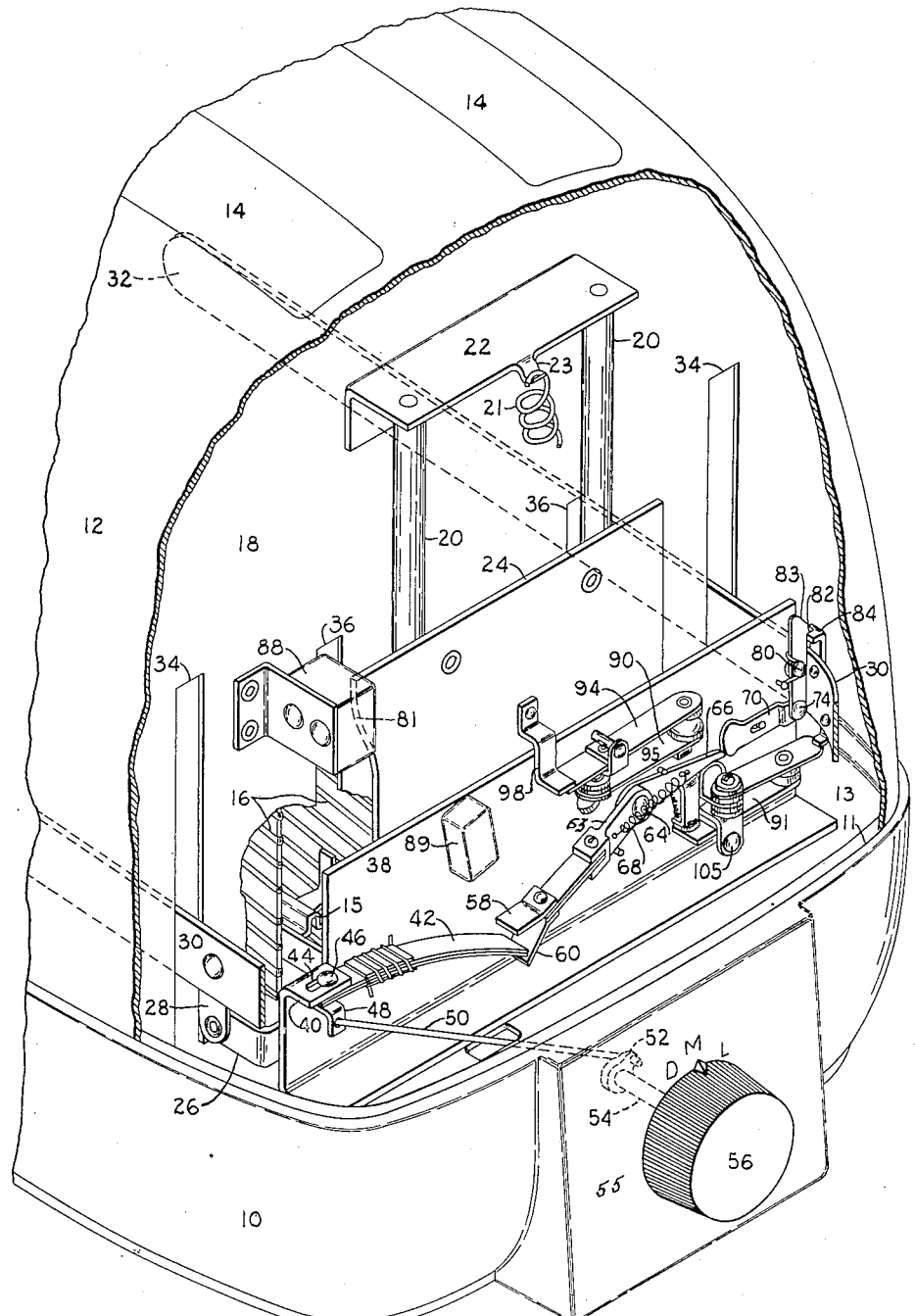
Figure 1 is a perspective view of a toaster with the parts broken away to better show the details of the timer according to this invention.

Referring to the drawings the numeral 10 represents a base for the toaster which base may be made of any insulating material such as hard rubber or other equivalent material.

Mounted within a shoulder 11 of the base 10 is the bottom edge of an appearance housing 12 which houses the entire working parts of the toaster. A supporting plate 13 is also mounted on the shoulder 11 of the base 10. The supporting plate 13 supports the entire mechanism of the toaster which is housed within the appearance housing 12.

The appearance housing 12 has a plurality of bread receiving openings 14 lying above bread carriers 15 upon which the bread rests during toasting operations. Main heaters 16 are positioned on each side of the bread carriers 15 to perform the toasting function.

A dividing plate 18 divides the interior of the toaster into an oven compartment and a mechanism compartment.

Secured to the supporting plate 13 are two vertically extending rods 20 which are secured at their upper ends to the dividing plate 18 by the bracket 22. The rods 20 form guides for a vertically reciprocating carriage plate 24 in a manner well known in the art.

Extending outwardly and rearwardly from the carriage plate 24 are a pair of lugs 26, one of which is shown in Figure 1. A pair of links 28 are pivoted at their lower ends to the lugs 26 and at their upper ends to lever arms 30, which in turn are pivoted as at 32 to the side walls of the toast chamber as is well known in the art.

The dividing plate 18 is provided with slots 34 for movement of the arms 30 and with slots 36 for vertical reciprocation of the bread carriers 15 which are attached at their forward ends to the carriage plate 24.

The arms 30 are adapted to be extended forwardly through a slot in the appearance housing 12 and have a manipulating knob (not shown) secured thereto in a manner well known in the art. A tension spring 21 is secured at its lower end to a lug (not shown) on the arms 30 and at its upper end is anchored to the lug 23 extending forwardly from the bracket 22. This spring normally biases the carriage plate 24 and bread carriers 15 to their upper bread receiving position.

Secured to the supporting plate 13, within the mechanism compartment in front of the dividing plate 18 is an upwardly extending plate 38 which supports the timer of this invention.

Extending forwardly from the plate 38 is a lug 40 which supports the thermal timer 42. The lug 40 is slotted as shown at 44 to cooperate with a rivet 46 passing through the bimetal thermal timer 42 so as to support the timer for reciprocation for a purpose to be hereinafter described.

A lug 48 extends downwardly from the bimetal 42 and pivotally engages the upper end of an actuating rod 50, the lower end of which is pivoted to crank arm 52, rigidly secured to a shaft 54 which extends through the extended front 55 of the base 10. A manually actuatable knob 56 is also rigidly attached to the shaft so that the position of the bimetal 42 may be manually adjusted.

Figure 2:
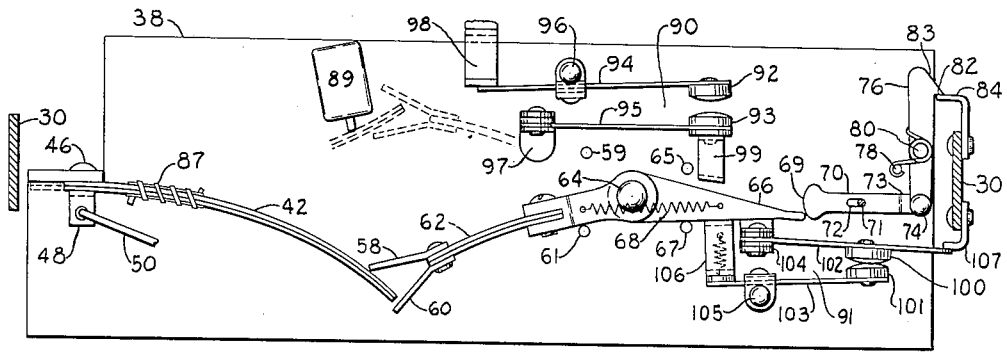
Figure 2 is a diagrammatic view depicting the parts of the timer of this invention with the thermal timer in cold position and the toast carriage in toasting position.
Figure 3:
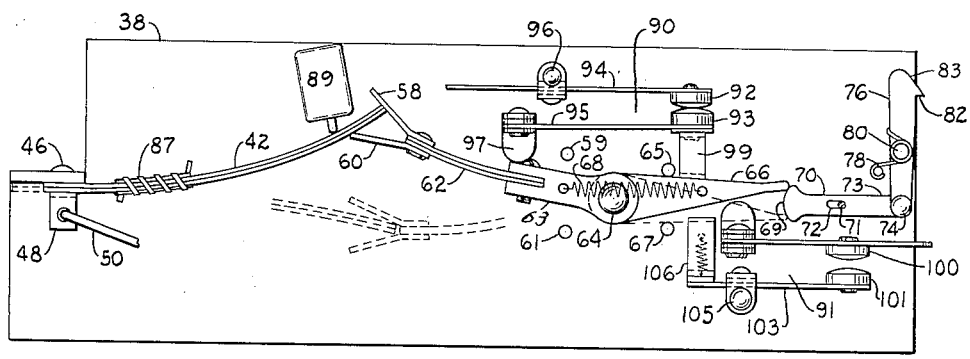
Figure 3 is a diagrammatic view depicting the position of the parts of the timer of this invention when the thermal timer is in hot position and the toast carriers in receiving position.

The thermally responsive bimetal timer 42 is so made that when cold it will be in downward position as shown in Figures 1 and 2 and when in its hottest position, it will be in an upward position as shown in Figure 3.

The outer end of the bimetal 42 cooperates with a pair of diverging members 58 and 60 secured to the outer end of a compensating bimetal 62. The compensating bimetal 62 is attached to a toggle arm 63 pivoted to the plate 38 at 64. The bimetal 62 and arm 63 forms one arm of a toggle mechanism having a second arm 66 also pivoted to the plate 38 at 64. A tension spring 68 is adapted to snap the toggle mechanism from one position to the other as will be explained in more detail hereinafter. Stop pins 59 and 61 limit the movement of toggle arm 63 and stop pins 65 and 67 limit the movement of toggle arm 66. The stop pins 59, 61, 65 and 67 are rigidly secured to plate 38.

The outer end of arm 66 cooperates with the inner end 69 of lever arm 70 slidably attached to the plate 38 by the pin 71 and slot 72. Pivoted to the lever arm 70 at its other end 73, as at 74, is a latch lever 76 which is biased in a clockwise direction about its pivot 80 by the spring 78. The latch lever 76 has a hook 82 which cooperates with a bracket 84 secured to one of the lever arms 30 to latch the carriers 15 in toasting position when the carriage plate 24 is moved downwardly against the bias of spring 21. Above the hook 82 the latch lever 76 has a cam surface 83 which cooperates with the bracket 84 to move the latch lever 76 counter-clockwise when the carriers 15 are moved to toasting position.

An auxiliary heater 87 is provided for heating the bimetal timer 42. The auxiliary heater 87 and the main heaters 16 are controlled by a plurality of switches 88, 89, 90 and 91.

The switch 88 is an on-off switch which is normally open and is closed by the cam 81 when the carriage plate 24 is moved to downward position.

The switch 89 is an on-off switch which is normally closed but is opened by the bimetal 42 in its hottest position as shown in full lines of Figure 3 and dotted lines of Figure 2.

The switch 90 comprises two contacts 92, 93 carried by arms 94, 95. The arm 94 is pivoted to plate 38 at 96. The arm 95 is a spring arm rigidly secured to plate 38 at 97. When the carriage plate 24 is down a lug 98 holds the arm 94 in its counterclockwise position so as to separate the contacts 92 and 93 regardless of the position of the spring arm 95. When the toggle arm 66 is in its upward position and the carriage plate 24 is in its upward position as in Figure 3, the lug 99 is engaged by the arm 66 to bias the spring arm 95 upwardly and close the contacts 92 and 93 under certain conditions as will be explained hereinafter.

The switch 91 comprises two contacts 100, 101 carried by the arms 102 and 103. The arm 102 is a spring arm and is rigidly attached to plate 38 at 104. The arm 103 is pivotally attached to the plate 38 at 105. A lug 106 cooperates with the toggle arm 66 to move the arm 103 counterclockwise under certain conditions. The lug 107 carried by one of the arms 30 biases the spring arm 102 downwardly to close the contacts 100 and 101 under certain conditions as will be explained hereinafter.

Figure 4:
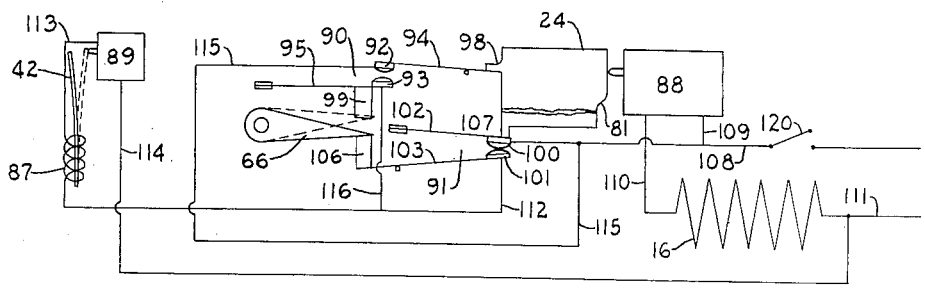
Figure 4 depicts the wiring diagram of the toaster and timer of this invention.

Referring to the wiring diagram of Figure 4, the carriage plate 24 is down and the switch 88 is held closed by the cam 81. The bimetal timer 42 is cold and the switch 89 is closed. The lug 98 of the carriage 24 holds the arm 94 in counterclockwise position as viewed in Figures 2 and 3 so that contacts 92 and 93 are separated. The lug 107 on the arm 30, attached to carriage plate 24 biases the spring arm 102 downwardly. The toggle arm 66 engages the lug 106 and holds the arm 103 in counter-clockwise position so that the contacts 100 and 101 are closed. The switch 120 will be closed manually.

Under these conditions parallel circuits will be established as follows: From one side of the line by closed switch 120, conductor 108, conductor 109, closed switch 88, conductor 110, main heaters 16 and conductors 111 to the other side of the line. From one side of the line by closed switch 120, conductor 108, closed contacts 100, 101, conductor 112, auxiliary heater 87, conductor 113, closed switch 89, conductor 114 and conductor 111 back to the other side of the line.

When the bimetal 42 is warm but not quite in its hottest position and the carriage 24 is up, the switch 88 will be open, the arm 94 will move to its clockwise position as viewed in Figures 2 and 3, the spring arm 102 will move to its upward position to open contacts 100 and 101, the toggle lever 66 will bias the spring arm 95 to its upper position so as to close the contacts 92, 93 and the switch 89 will remain closed.

Under such conditions, the main heaters 16 will be deenergized because the switch 88 is open. A circuit will be established from one side of the line by closed switch 120, conductor 108, conductor 115, closed contacts 92, 93, conductor 116, conductor 112, auxiliary heater 87, conductor 113, closed switch 89, conductor 114 and conductor 111 back to the other side of the line.

The auxiliary heater 87 will then continue to heat the bimetal timer 42 until the switch 89 is opened. The bimetal 42 will then cool to again close the switch 89 to reenergize the auxiliary heater 87. As long as the carriage plate 24 remains up, the bimetal 42 will oscillate back and forth to alternately open and close the switch 89 so as to maintain the bimetal 42 in its hottest position. This will have no effect on the toggle arm 66 since the movement of toggle arm 63 and of the outer end of the bimetal 42 is not sufficient during this oscillating movement to move the toggle arm 63 past its dead center position.

When the carriage plate 24 is again moved downwardly with the parts of the position shown in Figure 3, the cam 81 will close the switch 88 and reestablish a circuit through the main heater 16 as previously explained. The lug 98 on the carriage plate 24 will move the arm 94 of the switch 90 counter-clockwise as viewed in Figures 2 and 3 and open the contacts 92 and 93 so that the circuit through the auxiliary heater 87 will be maintained open whether the switch 89 is closed or open and permit the bimetal timer 42 to cool it to its lowermost position.

Operation

Suppose the entire toaster is cold and the operator desires dark toast. The manual switch 120 will be closed. The operator will then grasp the knob 56 and rotate it counter-clockwise to the position marked "D" on the front of the base 10 of Figure 1. This will move the bimetal timer 42 to the left as viewed in Figure 1. The outer end of the bimetal timer 42 will be moved toward the free ends of the diverging members 58 and 60 so that upon heating up the bimetal 42 will have to move farther before contacting the member 58 and upon cooling off it will have to move farther before contacting the members 60. As is apparent, this will lengthen the timing period whether the bimetal 42 is heating up or cooling off.

If medium toast is desired the knob 56 is moved clockwise to the position marked "M" in Figure 1. This will move the timer 42 to the right so that its end extends farther inwardly between the free ends of the members 58 and 60 so that the bimetal will not have to travel so far to trip the toggle mechanism. Thus the timing interval will be shorter than when the knob 56 is set for dark toast. This will be true whether the timer is operating on the heat-up cycle or the cool-off cycle. For light toast the knob is turned further clockwise to the position marked "L" in Figure 1.

The latch lever 76 will be in the position shown in Figure 3 with the lever 76 biased in clockwise position by the spring 78. As will appear hereinafter this will be true whether the bimetal 42 is in its hot or cold position when a toasting operation is begun and before the carriage plate 24 is moved downwardly.

Bread will then be inserted through the openings 14 so as to rest upon the carriers 15. The manipulating handle (not shown) attached to the arms 30 and extending forwardly from the appearance housing 12 will be moved downwardly so as to move the carriers 15 and the carriage plate 24 to toasting position.

The bracket 84 on the arm 30 will engage the cam 83 of the latch lever 76 and cause it to move counter-clockwise against the bias of the spring 78 until the hook 82 overlies the bracket 84 at which time the carriers 15 and the carriage plate 24 will be latched in their downward or toasting position.

This will cause the cam 81 to close the switch 88 and establish a circuit through the main heaters 16 as previously described. The lug 98 will move the arm 94 counter-clockwise as viewed in Figure 2 and hold the contacts 92 and 93 of switch 91 open regardless of the position of the toggle mechanism. The lug 107 on one of the arms 30 will bias the spring 102 of switch 91 downwardly and close contacts 100 and 101 because the arm 103 is held in its counter-clockwise position by the toggle arm 66. This will establish a circuit through the auxiliary heater 87 as previously described.

The auxiliary heater 87 will then slowly heat up the bimetal timer 42 until the toggle arm 63 moves past its dead center position at which time the spring 68 will snap the toggle arms 63 and 66 to their upward position against stop pins 59 and 65 respectively. This will permit the arm 103 to drop to its clockwise position and open the contacts 100 and 101. At the same time the outer end of the toggle arm 66 will contact the inner end 69 of the arm 70 and move it to the right as viewed in Figure 2. This will pivot the latch lever 76 counter-clockwise about its pivot 80 until the hook 82 disengages from the bracket 84 so as to release the carriage plate 24 for upward movement under the bias of spring 21. This will cause the carriers 15 to move upwardly so that the finished toast will project through the openings 14 and be readily accessible to the operator.

Movement of the toggle arm 66 to its upward position will bias the spring arm 95 upwardly. The contacts 92 and 93 will then be closed when the lug 98 is moved away from the outer end of arm 94 as the carriage plate 24 is released so as to permit the arm 94 to move to its clockwise position. As previously described this will establish a new circuit through the auxiliary heater 87 even though the switch 91 is opened by movement of the carriage 24 to upward position.

If a new toasting cycle is immediately begun, new bread will be inserted and the carriage plate 24 will be moved to lowered position. However, if a new toasting cycle is not immediately desired the auxiliary heater 87 will be intermittently energized by the opening and closing of switch 89 as previously described so as to maintain the bimetal timer 42 at its higher temperature.

Whenever the carriage plate 24 is moved downwardly for a second toasting cycle, whether it be immediately after the first or shortly thereafter, the carriage plate 24 will be latched in downward position by the latch lever 76 as previously described.

The switch 91 will remain open because the contacts 100 and 101 will be maintained apart by the previous movement of the arm 103 to its clockwise position. The switch 90 will also be opened as the lug 98 of carriage plate 24 will have moved arm 94 to its counter-clockwise position to hold the contacts 92 and 93 apart. This will completely deenergize the auxiliary heater 87 and allow the bimetal timer 42 to cool.

As the bimetal timer 42 cools its outer end will move downwardly, contact the member 60 of the bimetal 62 of toggle arm 63 so as to move the toggle arm 63 downwardly against the bias of the spring 68 until the arm 63 again moves past its dead center position when the spring 68 will snap the toggle arms 63 and 66 to their lower position against stop pins 61 and 67 respectively.

Movement of the toggle arm 66 to its downward position will move the arm 70 to the right as viewed in Figure 2 and pivot the latching arm 76 counter-clockwise against the bias of the spring 78 until the hook 82 releases the bracket 84 on one of the arms 30 and permit the carriage plate 24 to move upwardly as previously described.

Movement of the carriage plate 24 to its upward position will permit the spring arm 102 to move upwardly to its normal position where the contact 100 is out of contact with the contact 101 even though movement of the toggle arm 66 to its lowered position has already moved the arm 103 to its counter-clockwise position. Movement of the carriage plate 24 to its upward position will also permit the switch 88 to open and the entire toaster will be deenergized.

Now if a third toasting cycle is desired, bread will again be inserted through the openings 14 and the carriage plate 24 moved to downward position. The operation will be the same as for the first toasting cycle except for the action of the compensating bimetal 62 mounted on the end of toggle arm 63.

Since the toaster has already been operated for two previous cycles in quick succession the toaster as a whole and the bimetal timer 42 will be considerably hotter than for the first toasting cycle. However, bimetal timers have the tendency to over compensate. That is, the timer 42 will now be proportionately hotter than the toaster as a whole than the first first toasting cycle. Therefore, some means should be provided for delaying the action of the timer so that the timing interval will be somewhat longer than it otherwise would be.

The compensating bimetal 62 of toggle arm 63 performs this latter function. The compensating bimetal 62 is so made that it will bow upwardly when heated. Thus, for any toasting cycle after the first the compensating bimetal 62 will have moved upwardly so that the bimetal timer 42 will have to be heated somewhat before it will begin to move the toggle arm 63 upwardly. The design of the mechanism is such that this will just compensate for the tendency of the bimetal timer 42 to over compensate taking into consideration that the toaster as a whole is also hotter and that therefore the third toasting cycle should be correspondingly shortened over the first.

The operation of the timer for the third toasting cycle will be substantially the same as for the first except that the compensating bimetal 62 of toggle arm 63 will have moved upwardly to lengthen the toasting cycle over that which would result if the compensating bimetal 62 were not present. Thus, the carriers 24 will be released so as to move to their upward position at the proper time for the third toasting cycle so that the toast will be cooked to substantially the same degree as for the first toasting cycle.

If now a fourth toasting cycle is begun immediately after the third the timer will operate in substantially the same manner as for the second toasting cycle except for the action of the compensating bimetal 62. For the fourth toasting cycle the timer 42 will contain considerably more residual heat than for the second toasting cycle. If the timer is properly designed so as to time the second toasting cycle upon cooling down from its high to its low temperature the cycle would be too long for the fourth cycle unless some means is provided to shorten it. The compensating bimetal 62 of toggle arm 63 provides the necessary compensation.

At the initiation of the fourth toasting cycle the compensating bimetal 62 will also contain more residual heat than at the initiation of the second toasting cycle. Thus, its outer end will be higher for the fourth cycle than for the second. This will cause the end of the timing bimetal 42 to begin to move the toggle arm 63 sooner than would otherwise be the case. Thus, the arm 63 will move past its center sooner and the fourth cycle will be completed sooner than if the compensating bimetal 62 were not present.

From the foregoing it can be seen that the compensating bimetal 62 has two functions. It automatically lengthens the toasting interval when the timer is operating on the heat-up cycle and automatically shortens the timing interval when the timer is operating on the cool-off cycle so as to automatically compensate for rises in toaster temperature when the toaster is operated in rapid succession.

It can also be seen that the latch lever 76 also performs a novel function. It is moved in one direction to release the carriage plate 24 when the timer 42 heats up and in the same direction to release the carriage plate 24 when the timer 42 cools off.

It is to be noted that it is possible to terminate the successive use of the toaster when the timer is in its hot position. However, since the manual switch 120 will be open when the toaster is not in use the auxiliary heater 87 will be deenergized to permit the timer 42 to cool. This will naturally return the parts to their original position ready for use the next time the toaster is needed.

From the foregoing it can be seen that this invention provides a toaster timer which times the first toasting cycle by the time it takes the thermal element to heat up, the second by the time it takes the thermal element to cool off, the third by the time it takes the thermal element to heat up again, the fourth by the time it takes the thermal element to cool off again, and so on, with a single compensating bimetal which automatically lengthens the heat-up cycle and automatically shortens the cool-off cycle, as the toaster heats up with repeated use, over that which would result were the compensating bimetal not present, so as to overcome the tendency of the thermal timer to over compensate on the heat-up cycle and to under compensate on the cool-off cycle.

This invention also provides a manual adjustment for light, medium, and dark toast in which the bimetal timer is bodily moved to lengthen or shorten the timing interval as desired.

While we have shown but a single embodiment of our invention it is to be understood that this embodiment is to be taken as illustrative only and not in a limiting sense. We do not wish to be limited to the particular structure shown and described but to include all equivalent variations thereof except as limited by the scope of the claims.

We claim:

1. A toaster comprising, bread carriers movable from a bread receiving to a toasting position, main heating means positioned to perform a toasting function, a thermal timer for timing the duration of successive toasting operations, auxiliary heating means for said thermal timer, switch means actuated by movement of said carriers to toasting position for a first toasting operation for simultaneously energizing said main and auxiliary heating means to cause said thermal timer to move from its cold position to its hot position, and control means actuated by movement of said thermal timer from its cold position to its hot position for terminating said first toasting operation, said switch means being actuated by movement of said carriers to toasting position for a second toasting operation for deenergizing said auxiliary heating means to cause said thermal timer to move from its hot position to its cold position to time said second toasting operation, said control means being actuated by movement of said thermal timer from its hot position to its cold position to terminate said second toasting operation.

2. A toaster as set forth in claim 1 in which said switch means maintains said auxiliary heating means energized sufficiently to hold said thermal timer in its hot position between said first and second toasting operations.

3. A toaster as set forth in claim 1 in which said switch means intermittently energizes said heating means between said first and second toasting operations to maintain said thermal timer in its hot position between said toasting operations.

4. A toaster as set forth in claim 1 including manually actuatable means for moving said thermal timer relative to said control means to vary the timed interval whether said timer is moving from its cold position to its hot position or from its hot position to its cold position.

5. A toaster comprising, bread carriers movable from bread receiving to toasting position, a thermal timer for timing the duration of succeeding toasting operations, heating means for said thermal timer, said thermal timer being movable from its cold position to its hot position when heated and from its hot position to its cold position when permitted to cool, switch means for controlling the energization and deenergization of said heating means, means responsive to movement of said carriers to receiving position to actuate said switch means to energize said heating means between two successive toasting operations to maintain said thermal timer in its hot position, means responsive to movement of said carriers to toasting position for actuating said switch means to deenergize said heating means to permit said thermal timer to cool and time the following toasting operation, and control means actuated by movement of said thermal timer upon cooling for terminating said following toasting operation, said switch means being actuated by movement of said carriers to toasting position to reenergize said heating means to heat said thermal timer to cause it to move from its cold to its hot position for timing the next succeeding toasting operation, said control means being actuated by movement of said thermal timer from its cold position to its hot position to terminate the next succeeding toasting operation.

6. A toaster comprising, bread carriers movable from a bread receiving to a toasting position, a thermal timer for timing the duration of successive toasting operations, heating means for causing said thermal timer to move from one operative position to a second operative position, control means actuated by movement of said carriers to toasting position to energize or deenergize said heating means and cause said timer to move to a first operative position to time a first toasting operation and to terminate said first toasting operation after a predetermined interval, said control means being actuated by movement of said carriers to toasting position after termination of said first toasting interval to reverse the first energization or deenergization of said heating means and cause said timer to move from its first operative position to a second operative position to time a succeeding toasting operation and to terminate the succeeding toasting operation after a predetermined interval.

7. A toaster as set forth in claim 6 including thermostatic means responsive to toaster temperature for varying the duration of each of said toasting operations.

8. A toaster as set forth in claim 6 including thermostatic means responsive to toaster temperature for lengthening said first toasting operation and for shortening said second toasting operation.

9. A toaster as set forth in claim 6 including means responsive to toaster temperature for shortening one of said toasting operations and for lengthening the following toasting operation.

10. A toaster as specified in claim 6 including manually operable means for varying the duration of at least one of said toasting operations.

11. A toaster comprising bread carriers movable from receiving to toasting position, main heaters for performing successive toasting operations, a latch for latching said carriers in toasting position when said carriers are moved to toasting position, a thermal element for timing toasting operations in rapid succession, an auxiliary heater for said thermal element, control means for energizing said main heaters and said auxiliary heater by movement of said carriers to toasting position for a first toasting operation, release means actuated by heating of said thermal element for releasing said latch to permit said carriers to move to receiving position and to deenergize said main heaters while maintaining said auxiliary heater energized, means actuated by movement of said carriers to toasting position for a second toasting operation to deenergize said auxiliary heater while said main heaters are reenergized by said control means, said release means being so constructed as to be actuated by cooling of said thermal element to terminate the second toasting operation.

12. A timer comprising, a bimetallic element supported at one end so that its free end will move from a cold position to a hot position upon being heated and from its hot position to its cold position upon cooling, an over center snap toggle mechanism having a pair of toggle arms adjacent to said bimetallic element, a compensating bimetal supported by the free end of one of said arms and extending to adjacent the free end of said bimetallic element, said comensating bimetal being bifurcated at its free end to receive the free end of said bimetallic element between its bifurcations, the arrangement being such that movement of said bimetallic element in opposite directions will snap said toggle mechanism over center in opposite directions, said compensating bimetal being movable in the same direction as said bimetallic element with rises in ambient temperature whereby rises in ambient temperature will cause said compensating bimetal to increase the timing interval of said bimetallic element as it moves from its cold position to its hot position and decrease the timing interval of said bimetallic element as it moves from its hot position to its cold position.

13. A timer comprising, a bimetallic element supported at one end so that its free end will move from a cold position to a hot position upon being heated and back to its cold position upon cooling, a control actuating device associated with said bimetallic element, said control actuating device including a compensating bimetal having a free end extending toward the free end of said bimetallic element, a lost motion connected between the free ends of said compensating bimetal and said bimetallic element, the arrangement being such that movement of the free end of said bimetallic element from its cold position to its hot position will operate said control actuating device to time the first timing interval and movement of the free end of said bimetallic element from its hot position to its cold position will operate said control actuating device to time the next succeeding timing interval, said compensating bimetal being so constructed that its free end tends to move in the same direction as the free end of said bimetallic element as the temperature rises whereby upon rises in ambient temperature said compensating bimetal will increase the timing interval of said bimetallic element as its free end moves from its cold position to its hot position and will decrease the timing interval of said bimetallic element as its free end moves from its hot position to its cold position.

14. A toaster comprising, bread carriers movable from a bread receiving to a toasting position, a thermal timer for timing the duration of successive toasting operations, said timer being movable from a cold position to a hot position upon being heated and back to its cold position upon cooling, heating means for heating said thermal timer, control means positioned to be actuated to energize said heating means by a first movement of said carriers to toasting position to cause said timer to move to its hot position for timing one toasting operation, said control means being constructed to be actuated by movement of said carriers to toasting position a second time for terminating heating of said thermal timer to permit said thermal timer to cool and return to its cold position to thus time a succeeding toasting operation, and means actuated by said control means upon movement of said timer to either its hot position or cold position for conditioning said carriers for movement to receiving position.

CURTIS C. COONS.
OTIS B. SUTTON.

REFERENCES CITED

The following references are of record in the file of this patent:

UNITED STATES PATENTS

| Number | Name | Date |
|---|---|---|
| 393,132 | Wagner | Nov. 20, 1888 |
| 1,795,013 | Denman | Mar. 3, 1931 |
| 2,091,255 | Coleman et al. | Aug. 31, 1937 |
| 2,236,402 | Gomersall | Mar. 25, 1941 |
| 2,254,687 | Koci | Sept. 2, 1941 |
| 2,254,946 | Ireland | Sept. 2, 1941 |
| 2,274,810 | Sardeson | Mar. 3, 1942 |
| 2,276,555 | Wolf et al. | Mar. 17, 1942 |
| 2,288,640 | Paulus | July 7, 1942 |
| 2,303,561 | Koci | Dec. 1, 1942 |
| 2,315,327 | Gomersall | Mar. 30, 1943 |
| 2,320,347 | Brosseau et al. | June 1, 1943 |
| 2,325,551 | Scharf | July 27, 1943 |
| 2,355,041 | Baak | Aug. 8, 1944 |
| 2,386,278 | Strother | Oct. 9, 1945 |